2,926,111

METHOD OF FORMING A PROTECTIVE COATING ON FERROUS METAL SURFACES

Donald G. Schweitzer, East Islip, John R. Weeks, Port Jefferson, Otto F. Kammerer, St. James, and David H. Gurinsky, Center Moriches, N.Y., assignors to the United States of America as represented by the United States Atomic Energy Commission No Drawing. Application April 3, 1958
Serial No. 726,297

11 Claims. (Cl. 148—6.11)

The present invention relates to a method of inhibiting the corrosive attack of liquid metal on a ferrous metal surface by forming a protective film or layer on said surface.

Certain of the low-melting, heavy metals have been found to be desirable for use in connection with the generation and transfer of heat from a nuclear reactor. For thermal reactors, i.e., those in which the majority of the fission neutrons are moderated to thermal energies, the liquid metal must have a low capture cross section for thermal neutrons, a low melting point, a relatively high thermal conductivity and specific heat, and, when the fissionable material is used in the fused metal, the metal should preferably have an appreciable solubility for the fissionable material. Metals that meet these requirements to a high degree for use in a nuclear reactor are liquid bismuth and mixtures of liquid bismuth with lead and/or tin.

A principal difficulty in using liquid bismuth or any other of the aforementioned liquid metals in connection with nuclear reactors or other heat-producing apparatus is that at the elevated temperatures at which they are serviceable as heat transfer media they are highly corrosive. At elevated temperatures they have the capacity to dissolve, even under isothermal conditions, most structural materials with which they are in contact. In a non-isothermal cyclic flow system, these metals can dissolve container materials in a high temperature zone of the system and precipitate them in a low temperature zone. This process is referred to as "mass transfer." The corrosion products can build up to such an extent in the low temperature zone that they cause plugging in flow channels or conduits, especially in the relatively narrow passages of heat exchanger. It is, accordingly, a principal object of the present invention to inhibit the attack on certain metal surfaces by heavy liquid metal media brought into contact therewith under isomethrmal and particularly under non-isothermal conditions.

Certain steels available in commerce could be used advantageously as containers for liquid bismuth or other corrosive, heavy liquid compositions at elevated temperatures if they were not corrosively attacked or dissolved by these liquid metals. It is, therefore, an additional object of the present invention to render steels resistant to the corrosive action of heavy, liquid metal compositions at elevated temperatures.

Another object of the present invention is to form a highly stable, adherent film or layer of a metal carbide on a metal surface to thereby provide a metal container system resistant to the corrosive attack of liquid metals in contact therewith.

Other objects will in part be obvious and in part be pointed out from the description which follows.

Other objects of our invention are achieved by treating a steel having as an essential ingredient a metal which will effectively inhibit the availability of nitrogen at the surface of the steel by forming a stable compound with nitrogen and thereafter contacting the steel with a liquid metal containing zirconium dissolved therein to thereby form an adherent, corrosion and erosion resistant carbide layer on said surface. Adherent layers of the carbides of titanium and hafnium may be formed alternatively to provide corrosion and erosion resistant surfaces in accordance with our invention. By a stable compound of nitrogen we mean one which will not be decomposed under the conditions of carbide formation as indicated hereinafter. We have found that a metal selected from a group of nitride-forming metals consisting of aluminum, titanium and zirconium is particularly effective for this purpose. Peculiarly, these metals react more readily with the nitrogen in the steel than with the carbon. The nitrides of these metals have been found to be of greater stability than those of the principal components generally found in steels.

Substantially all steels which are fabricated today inherently contain a small percentage of nitrogen, either dissolved therein or combined with the impurities and/or alloy constituents of the steel. In accordance with our invention, we have found that in order to form an adherent carbide layer on the surface of nitrogen-containing steels, it is necessary that a major proportion of the available nitrogen be combined as a stable compound prior to the formation of the carbide. By "available" nitrogen, we mean any nitrogen which, under the conditions of carbide formation at the steel surface, as described more fully hereinafter, may inhibit or prevent formation of a carbide layer at said surface. The total nitrogen content of the steel as well as the maximum concentration of the nitride-forming metal may vary over wide limits. However, we have found that in those cases we have studied the nitride-forming metal must react with at least about 50% of the total nitrogen in the steel to reduce the available nitrogen of the steel sufficiently to insure formation of a carbide layer at the steel surface.

According to one mode of practicing our invention, a steel specimen is prepared containing a metal which will form a stable nitride. The metal is then heated at a relatively high temperature to convert a major portion of the total nitrogen present in the steel to the corresponding stable nitride. A temperature in the range 600 to about 1100° C. is suitable for this purpose; time at temperature may vary over a wide range depending upon the composition of the particular steel specimen. The surface of the heat-treated steel is then contacted with a liquid metal containing zirconium dissolved therein to form an adherent layer of zirconium carbide at said surface. It is preferred to use a high concentration of zirconium up to a saturated solution of zirconium in the particular liquid metal used, although a concentration of as little as two parts per million of zirconium has been found to form an adherent zirconium carbide layer on the surface. An adherent layer of as little as ½ micron thickness may be achieved by contacting the pre-treated steel with a solution of about two parts per million zirconium in liquid bismuth maintained at a temperature in the range 550 to 850° C.

The carbide layer has been found to effectively prevent reaction of substances dissolved in the liquid metal with the container metal. For example, in the case of a solution of uranium in bismuth, there is no appreciable loss of uranium from solution when it is introduced into a bismuth solution of zirconium or a bismuth solution of zirconium and/or magnesium in flow systems fabricated of various steels having a carbide layer.

One feature of the subject method which is particularly advantageous for providing continuous protection against attack of a structural metal surface is the possibility of continuously forming carbide on freshly exposed surfaces of the metal to be protected. This is particularly advantageous in cases where erosion is of importance. At a particular velocity, a given volume of flowing liquid bismuth has many times the kinetic energy of water. The high impact pressures produced at sharp turns or at pipe bends can cause extensive erosion of the metal surface. When a heavy liquid metal composition containing at least about two parts per million of zirconium dissolved therein is maintained in a steel container and the amount of available nitrogen is maintained at a low level in the container metal, any fresh metal surfaces which become exposed due to a crack or fissure developing in the container surface film will be repaired and thereby protected from attack by the formation of a carbide layer on the newly exposed surface.

The present invention thus contemplates the continuous protection of a container metal surface from attack by liquid metal solutions by the initial formation of a protective carbide layer and thereafter by maintaining in said solution a concentration of at least two parts per million of zirconium to provide a continuous protective surface layer on the surface of the container.

In Table I there are listed a number of examples of nitrogen-containing steel specimens in which an adherent zirconium carbide layer was formed. The critical elements of our process will become apparent from the following discussion with reference to the table.

Known metallurgical and chemical techniques were employed in purifying, testing and examining the metal specimens. Such procedures are described in the article entitled "Corrosion Problems With Bismuth Uranium Fuels," published in volume 9 of "Proceedings of the International Conference on the Peaceful Uses of Atomic Energy," pages 341–355. However, it will be understood that numerous other procedures for controlling the concentration, introduction and removal of ingredients and their purification may be employed.

The specimens listed in Table I were immersed in baths of purified bismuth maintained at temperaures in the range 550 to 850° C. and containing at least two parts per million of zirconium dissolved therein; time at temperature varied from 20 to 550 hours. Steel specimens of similar composition immersed in a solution of zirconium and liquid bismuth for the same period of time, but containing no aluminum, titanium or zirconium, do not form the carbide layers. After the prescribed period of immersion, the experimental samples were removed from the bath and washed with hot mercury to remove excess bismuth. Only samples 1–9 had a surface of zirconium carbide as determined by X-ray diffraction measurements, but no carbide surface was formed on samples 10, 11 and 12. It will be noted from Table I that in these latter specimens only a small percentage of the nitrogen existed in the steel in the form of a stable nitride; sample 10, for example, had only 1% of its total nitrogen combined as the stable aluminum nitride.

In another experiment, sample 10 (which did not form a carbide layer) was heat treated for a period of 260 hours at a temperature of about 720° C. After heat treatment, thet steel was analyzed and found to have 80% of its nitrogen content combined with aluminum as aluminum nitride. This heat-treated specimen, upon immersion in a bath of liquid bismuth containing at least two parts per million of zirconium, forms a protective zirconium carbide layer on its surface.

Thus, steels which do not normally form carbide layers (samples 10, 11 and 12) may, as the result of the heat pre-treatment step, be converted to a carbide-forming steel. The heat pretreatment can be carried out at any temperature in the range 550° C. to about 1100° C. for a period of time, depending on the composition of the steel, to convert at least a portion of the nitrogen in the steel to a stable nitride, and thus reduce the available nitrogen at the steel surface. Temperatures below 550° C. are not practical since an inordinately long heat pretreatment is required to convert the nitrogen into the stable nitrides. It should be noted that this heat pretreatment may be performed without a protective atmosphere to avoid nitrogen contamination and still produce a steel having a surface that will form the carbide.

In order to determine the protective effect of a zirconium carbide layer, three separate thermal convection loops were set up made of steel tubing fabricated from steel having the same composition as samples 6, 7 and 8 of Table I. A carbide layer was then formed on the interior surfaces of each loop by circulating a solution of zirconium in liquid bismuth therethrough. After a carbide layer was formed, liquid bismuth was then circulated through each loop; a temperature in the range 550 to 575° C. was maintained in the hot leg of each loop and a temperature differential of 75 to 100° C. was maintained bewteen the hot and cold end of each loop. At the end of 6000 hours, autoradiographs were taken of each loop system, and it was found that the loops had not corroded in the hot zones, and practically no deposition of metal was detected in the cold zones.

Circulation systems having a carbide surface in accordance with this invention in which bismuth containing zirconium and other metal additives, e.g. uranium and magnesium, has been circulated through a high and low temperature region, differing in temperature by as much as 125° C., have been operated for periods greater than about 20 times the life of a similar circulation system having no carbide surface. It has been further observed that in systems operated at high temperature differentials, where the rate of mass transfer is normally great, the rate of mass transfer actually decreases with time where the protective carbide layer is formed on the surface of the metal, apparently because the rate or extent of solution of the steel is substantially reduced.

From the foregoing it is apparent that our invention provides an effective method for inhibiting the attack of iron-base alloys by heavy, low-melting liquid metals and therefore provides container systems in which these heavy

*Table I*

| Sample No. | Percent Concentration | | | | | | | | | | Percent N as AlN | Film Formed |
|---|---|---|---|---|---|---|---|---|---|---|---|---|
| | C | Mn | Si | P | S | Cr | Mo | Al (Soluble) | N (Total) | N as Nitride | | |
| 1 | .13 | .63 | .32 | .014 | .012 | 2.6 | 1.1 | .140 | .015 | .015 | 100 | ZrC |
| 2 | .09 | .40 | .26 | .011 | .010 | 2.4 | 1.0 | .440 | .054 | .025 | 50 | ZrC |
| 3 | .10 | .40 | .10 | .011 | .020 | 2.2 | 1.0 | .014 | .013 | .009 | 70 | ZrC |
| 4 | .10 | .44 | .24 | .014 | .016 | 2.2 | 1.0 | .022 | .015 | .010 | 70 | ZrC |
| 5 | .11 | .46 | .37 | .016 | .016 | 2.5 | 1.0 | .020 | .015 | .011 | 75 | ZrC |
| 6 | .11 | .47 | .82 | .012 | .017 | 1.24 | .53 | .016 | .013 | | | ZrC |
| 7 | .011 | .48 | .75 | .011 | .013 | 1.24 | .55 | .020 | .014 | .010 | 70 | ZrC |
| 8 | .31 | .12 | .14 | .018 | .02 | | | ¹.020 | | | | ZrC |
| 9 | .15 | .45 | .01 | .07 | .025 | | | .074 | .018 | .010 | 55 | ZrC |
| 10 | .11 | .07 | .24 | .01 | .01 | 2.4 | 1.0 | .060 | .047 | .0003 | 1.0 | ZrN |
| 11 | .12 | | .3 | | | 4.8 | .51 | .016 | .023 | .0002 | 1.0 | ZrN |
| 12 | .10 | .40 | .21 | .014 | .014 | 2.4 | 1.0 | .003 | .042 | .0001 | 0 | ZrN |

¹ Contained .31% titanium.

liquid metals may be used effectively for the transfer of heat and other applications.

Since many embodiments might be made of the present invention and since many changes might be made in the embodiment described, it is to be understood that the foregoing description is to be interpreted as illustrative only and not in a limiting sense.

We claim:

1. A method of inhibiting the corrosion of a ferrous metal containing carbon by heavy liquid metals which comprises bringing zirconium and said carbon into reactive contact to form on said metal surface an adherent layer of zirconium carbide and thereafter maintaining zirconium dissolved in said heavy liquid metal in contact with said metal surface.

2. A method of forming a protective layer of zirconium carbide on the surface of a steel which comprises decreasing the available nitrogen content of said steel and thereafter contacting the surface to be protected with a heavy liquid metal containing zirconium dissolved therein.

3. The method of forming a protective layer of zirconium carbide on the surface of a steel specimen which comprises decreasing the available nitrogen content of said steel and thereafter contacting the surface to be protected with a solution of zirconium in liquid bismuth.

4. A method of inhibiting the corrosive effects of a heavy liquid metal of a nitrogen-containing steel which comprises treating said steel to convert at least a major portion of the nitrogen normally present in said steel to a stable nitride and thereafter contacting said surface with a liquid metal containing zirconium dissolved therein at a temperature at which zirconium carbide is formed on said surface.

5. The method of forming a protective layer of zirconium carbide on a surface of a nitrogen-containing steel which comprises reacting the nitrogen with a metal in said steel which forms a nitride stable at a zirconium carbide-forming temperature and thereafter contacting the surface of said steel with a solution of zirconium in liquid bismuth at a temperature of about 550° C.

6. A method of inhibiting the corrosion of metal container surfaces by a corrosive heavy liquid metal brought into contact therewith which comprises reacting a steel containing as an essential ingredient a metal selected from the group consisting of aluminum, titanium and zirconium to form a stable nitride with nitrogen present in said steel and thereafter contacting the surface of said steel with a heavy liquid metal containing zirconium dissolved therein to the extent of at least about two parts per million at a temperature about 550° C. for a period sufficient to form a layer of zirconium carbide on said surface.

7. A method of inhibiting the corrosion of metal container surfaces by a corrosive, heavy liquid metal brought into contact therewith which comprises reacting a steel containing as an essential ingredient, a metal selected from the group consisting of aluminum, titanium and zirconium with about 50% of the total nitrogen content of said steel to reduce the available nitrogen in said steel and thereafter contacting the steel surface with a heavy liquid metal containing zirconium dissolved therein to the extent of at least about two parts per million at a temperature above 550° C. for a period sufficient to form a layer of zirconium carbide thereon.

8. A method of inhibiting the corrosion of metal container surfaces by a corrosive, heavy liquid metal brought into contact therewith which comprises reducing the available nitrogen content of a steel containing as an essential ingredient a metal selected from the group consisting of aluminum, titanium and zirconium by reacting said metal with about 50% of the total nitrogen content in said steel to form a stable nitride and thereafter contacting the steel surface with a liquid bismuth composition containing at least about two parts per million zirconium at a temperature in the range 550 to 1100° C. to form an adherent zirconium carbide layer on the steel surface.

9. A method of inhibiting the corrosion of metal container surfaces by a corrosive, heavy liquid metal brought into contact therewith which comprises reducing the available nitrogen content of a steel containing aluminum as an essential ingredient by reacting said steel with about 50% of the total nitrogen content in said steel to form a stable nitride and thereafter contacting the steel surface with a liquid bismuth composition containing at least about two parts per million zirconium at a temperature in the range 550 to 1100° C. to form an adherent zirconium carbide layer on the steel surface.

10. A method of inhibiting the corrosion of metal container surfaces by a corrosive, heavy liquid metal brought into contact therewith which comprises reducing the available nitrogen content of a steel containing titanium as an essential ingredient by reacting said steel with about 50% of the total nitrogen content in said steel to form a stable nitride and thereafter contacting the steel surface with a liquid bismuth composition containing at least about two parts per million zirconium at a temperature in the range 550 to 1100° C. to form an adherent zirconium carbide layer on the steel surface.

11. A method of inhibiting the corrosion of metal container surfaces by a corrosive, heavy liquid metal brought into contact therewith which comprises reducing the available nitrogen content of a steel by reacting said steel with about 50% of the total nitrogen content in said steel to form a stable nitride, said steel containing zirconium as an essential ingredient, and thereafter contacting the steel surface with a liquid bismuth composition containing at least about two parts per million zirconium at a temperature in the range 550 to 1100° C. to form an adherent zirconium carbide layer on the steel surface.

References Cited in the file of this patent

UNITED STATES PATENTS

| | | |
|---|---|---|
| 1,098,794 | Fleming | June 2, 1914 |
| 1,794,810 | Van Arkel et al. | Mar. 3, 1931 |
| 2,681,876 | De Santis et al. | June 22, 1954 |
| 2,685,545 | Sindeband | Aug. 3, 1954 |

FOREIGN PATENTS

| | | |
|---|---|---|
| 762,931 | Great Britain | Dec. 5, 1956 |